United States Patent [19]

Böhringer et al.

[11] Patent Number: 4,577,606
[45] Date of Patent: Mar. 25, 1986

[54] PRESSURE VALVE ASSEMBLY FOR FUEL INJECTION PUMPS

[75] Inventors: Wilfried Böhringer, Flein; Franz Eheim, deceased, late of Stuttgart, by Helga Eheim, legal representative; Wolfgang Fehlmann; Helmut Laufer, both of Stuttgart; Karl Zibold, Asperg, all of Fed. Rep. of Germany

[73] Assignee: Robert Bosch GmbH, Stuttgart, Fed. Rep. of Germany

[21] Appl. No.: 671,432

[22] Filed: Nov. 13, 1984

[30] Foreign Application Priority Data

Nov. 17, 1983 [DE] Fed. Rep. of Germany ....... 3341575

[51] Int. Cl.$^4$ ............................................. F02M 39/00
[52] U.S. Cl. .................................... 123/506; 123/467; 417/503; 137/493.3
[58] Field of Search ................. 123/506, 467, 495; 417/503, 307, 499, 489, 296; 137/493.1, 493.3, 493.4, 493.6, 493.8, 493.9

[56] References Cited

U.S. PATENT DOCUMENTS

| | | | |
|---|---|---|---|
| 2,865,396 | 12/1958 | Focht | 137/493.3 |
| 3,477,458 | 11/1969 | Maddalozzo | 137/493.3 |
| 3,742,926 | 7/1973 | Kemp | 123/506 |
| 3,762,386 | 10/1973 | Uvaille | 123/467 |
| 3,896,845 | 7/1975 | Parker | 137/493.3 |
| 3,965,876 | 6/1976 | Tissot | 123/467 |
| 4,396,033 | 8/1983 | Narumi | 417/307 |
| 4,459,086 | 7/1984 | Hafele | 417/296 |
| 4,467,767 | 8/1984 | Kampichler | 123/506 |
| 4,478,189 | 10/1984 | Fenne | 123/467 |

FOREIGN PATENT DOCUMENTS 1445750 8/1976 United Kingdom ............... 123/467

Primary Examiner—Carl Stuart Miller
Attorney, Agent, or Firm—Michael J. Striker

[57] ABSTRACT

In a pressure valve inserted in a fuel supply conduit between a fuel injection pump and an injection vavle of the internal combustion chamber and comprising a valve member and a locking member cooperating with the valve member and opening in the direction of the fuel supply, and a back-pressure relief valve including a closing element which closes an axial bore of the locking member, a throttle orifice is provided in the connection between the axial bore of the locking member and an axial recess formed in the connection element connected to the fuel supply conduit leading to the internal combustion engine so that no after-injections occur, and a sufficiently great stable pressure is maintained in the fuel supply system.

15 Claims, 8 Drawing Figures

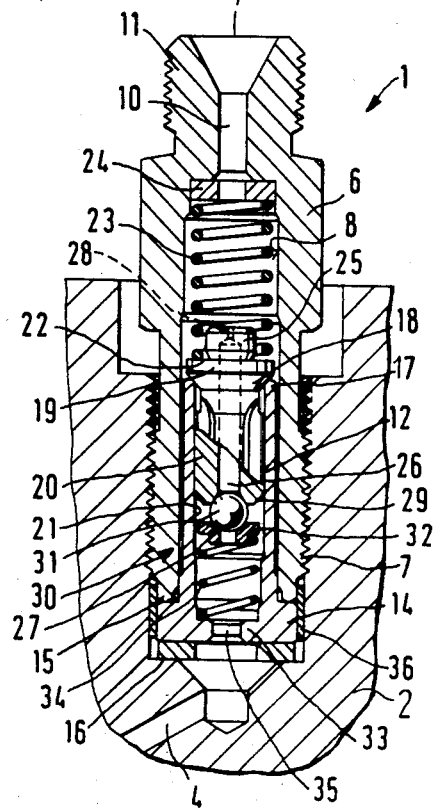
FIG.1
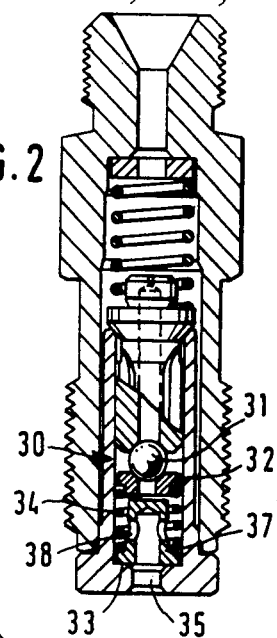
FIG.2
FIG.1a
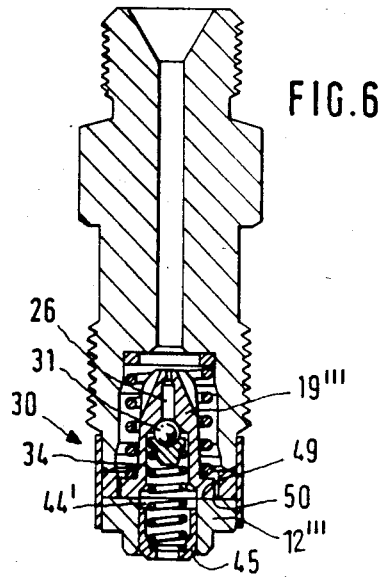
FIG.6
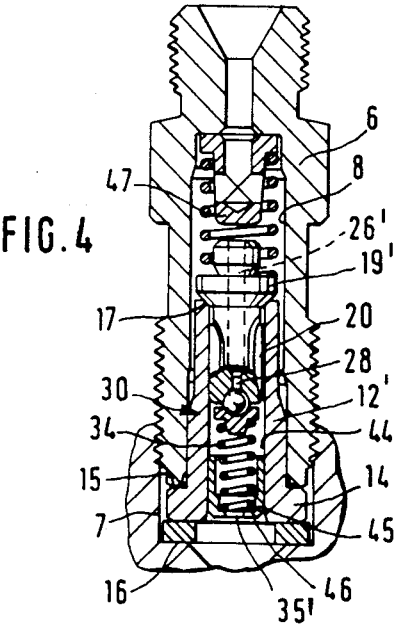
FIG.4

PRESSURE VALVE ASSEMBLY FOR FUEL INJECTION PUMPS

BACKGROUND OF THE INVENTION

The present invention relates to a pressure valve for fuel injection pumps.

Pressure valves of the type under discussion are normally positioned in a fuel delivery or fuel supply conduit between a pump working chamber of the fuel injection pump and an injection valve of the internal combustion engine.

The pressure valve of the foregoing type has been disclosed for example in U.K. Pat. No. 1,445,750. The known pressure valve includes a cup-shaped valve locking element, the end face of which at the open end of the cup-shaped locking element is formed as a sealing surface, and the valve locking element is guided in a tubular valve member and has a valve seat at the injection pump-side end at the inner bore of reduced diameter of the tubular valve member. The cup-shaped locking element further includes in its bottom an axial bore which is controlled by the closing member of the pressure relief or check valve. This axial bore is not formed as a throttle. The object of such conventional construction has been to provide a damage-resistant valve with a non-detachable support for the storing spring of the pressure relief valve and to prevent the penetration of great particles into the pump working chamber in the case of failure of the structural components of the pressure valve. For this purpose the valve member of the known valve has a base which is formed with a through bore to enable the fuel passage to be formed around the support of the compression spring of the check valve. With this known construction specifically the support of the compression spring of the relief valve is arranged at the level of the seat surface in the valve member. The known pressure valve assembly, however, makes it difficult to adjust a prestressing of the compression spring of the relief valve. Supporting discs or washers have been employed for this purpose, which, on the one hand, have reduced the cross-section of the through passage at the base of the valve member, and, on the other hand, have hindered the movement of the valve locking element of the pressure valve.

SUMMARY OF THE INVENTION

It is an object of the present invention to provide an improved pressure valve for fuel injection pumps for internal combustion engines.

This and other objects of the invention are attained by a pressure valve, which is inserted in a fuel delivery conduit between a pump working chamber of a fuel injection pump and an injection valve of an internal-combustion engine, and comprising a connection element having an axial recess at a pump-side thereof and a connection channel extended from said recess and connectable to the fuel delivery conduit; a valve member provided with a valve seat and having a periphery and formed with a flange at said periphery, said connection element having at the pump side an end face, said pump having a housing receiving the pressure valve and being formed with a shoulder, said flange being clamped between said end face and said shoulder, said valve member having a through passage; a locking member cooperating with said valve seat; a compression spring positioned in said axial recess at a side thereof facing said channel, said locking member being inserted between said valve seat and said compression spring and including an axial passage; a back-pressure relief valve including a closing member for closing said axial passage and a compression spring which is fixedly supported at least immediately on said valve member, said axial passage being connected with said axial recess; and throttle means connecting said axial passage with said axial recess at the side thereof facing said connection channel.

The advantage of the pressure valve assembly according to the present invention resides in that pressure fluctuations eventually occurring in the fuel delivery system between the fuel injection valve connected to the fuel supply conduit and the pressure valve are quickly damped and reduced. The specific pressure valve operates in the conventional fashion so that as soon as an effective advancement of the pump piston of the fuel injection pump is completed the connection between the pump working chamber and the fuel supply conduit is interrupted. Thereby the injection valve becomes closed without, however, the fuel being after-injected. Upon the closing of the pressure valve and the fuel injection valve, pressure fluctuations due to dynamic processes in the fuel delivery system occur, which, if they are quickly damped, have pressure peaks which can open a valve needle of the fuel injection valve so that the fuel will be injected afterwards which is undesired. If the pressure valve is not completely closed or at least initially is not closed completely the pressure waves can be effectively quickly reduced so that subsequent fuel drops will be prevented. Constant residual pressure is maintained between the fuel injection valve and the pressure valve with the aid of the pressure relief or check valve so that no combustion gases occur in the fuel injection valve during injection interruptions. If the check valve failed the pressure in the fuel supply or delivery system could considerably drop during the suction stroke of the pump piston, so that combustion gases would appear in the fuel delivery system. These gases would substantially adulterate the amounts of fuel injected per one working cycle, and would also damage the fuel injection valve. Due to the provision of the throttle according to the present invention in addition to the above described mode of operation of the pressure valve, it will be achieved that a constant steady pressure will be maintained in the fuel supply system during intervals between injections, on the one hand, and pressure fluctuations, which normally cause after-injection of the fuel, will be very quickly reduced by the throttle, on the other hand. A reliable closure of the valve is specifically required for the fuel supply of the quick-running direct-injection internal-combustion engines. A stable injection start with the smallest volumes of dispersion from one stroke to another stroke will be obtained.

The valve member may have a tubular portion inserted in said axial recess, said tubular portion having an end face forming said valve seat.

The valve member may have at a pump-side thereof an inner collar, said inner collar forming a supporting shoulder for the compression spring of the back-pressure relief valve.

The pressure valve may further include a cap-shaped spring washer inserted between the compression spring of the back-pressure relief valve and the supporting shoulder of said inner collar.

The locking member may have conical sealing surfaces, and guiding surfaces through which the locking member is guided in the tubular portion of said valve member.

The above specified features of the pressure valve offer a pressure valve which is inexpensive in manufacture, is very easy to assemble, and whose stable pressure is easily adjusted by the prestressing of the compression spring of the pressure relief or check valve. Specifically advantageous is the construction of the valve locking member in which plates or shims are inserted for the adjustment of the prestressing of the spring.

The valve member may have an axial bore forming said through passage; the pressure valve may include a sleeve pressed in said axial bore and forming a support for the compression spring of the back-pressure relief passage.

This embodiment is also very advantageous because the valve member has an easily manufactured construction and can be easily assembled with the connection support. This embodiment also offers the possibility to precisely adjust the opening pressure of the check valve in the assembled condition of the pressure valve in which the sleeve is more or less deeply pressed-in the cylindrical portion of the valve member.

The locking member may be cap-shaped and formed with a flat valve seat, said locking member having an end face forming one sealing surface, said valve member being substantially disc-shaped and having another end face forming another sealing surface with said one sealing surface. With this embodiment a very short pressure valve can be manufactured, with easily processed sealing surfaces on the valve member and on the locking member.

The axial passage of the locking member may be formed as a pocket bore, said throttle means being an orifice formed in said locking member and extended from said pocket bore transversely of an axis of the locking member, said orifice opening at a portion of the locking member which extends in said axial recess. The pressure valve may further include a cap-shaped spring washer inserted in said axial recess, said spring washer having connection openings extended transversely of a peripheral wall of the spring washer, said spring washer acting as a stop for said locking member.

The above described embodiment has the advantage that the maximal stroke of the valve locking member is limitable and the opening of the throttle orifice will not be effected in any position of the valve locking member neither by the stop against the spring washer nor by the accumulation of contamination particles at this place.

The outer diameter or the flange of the valve member may be equal to the outer diameter of the connection element facing said flange; the valve including a springy clamp connecting said flange to said connection element.

The valve member may have a tubular portion inserted in said axial recess and an end face forming the valve seat, said locking member having a conical sealing surface cooperating with said valve seat, said locking member having a guiding pin connected to said conical sealing surface, said valve member having an axial through bore into which said guiding pin extends, said guiding pin including guiding surfaces extended in a plurality of radial planes, the closing member of the back-pressure relief valve being substantially disc-shaped and provided with guiding surfaces for a coaxial guidance of said closing member within said through bore, said closing member having an end face forming one sealing surface, said locking member having an end face forming another sealing surface cooperating with said one sealing surface.

The locking member may have a guiding pin facing the compression spring, said throttle means being a throttle orifice formed in said guiding pin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is an axial sectional view of the pressure valve of the first embodiment, in which the valve member has an inner flange formed as a support for a compression spring of a back-pressure relief valve;

FIG. 1a is an enlarged detail of FIG. 1;

FIG. 2 is an axial sectional view through the pressure valve of the first embodiment, which has a spring washer and a stop for the back-pressure relief valve;

FIG. 4 is an axial sectional view of the fourth embodiment, in which the pressure valve is provided with a pressed-in sleeve operated as a bearing for the compression spring of the back-pressure relief valve;

FIG. 6 is a sectional view of the valve of still another embodiment; and

DETAILED DESCRIPTION OF THE PREFERRED EMBODIMENTS

Figure 3:
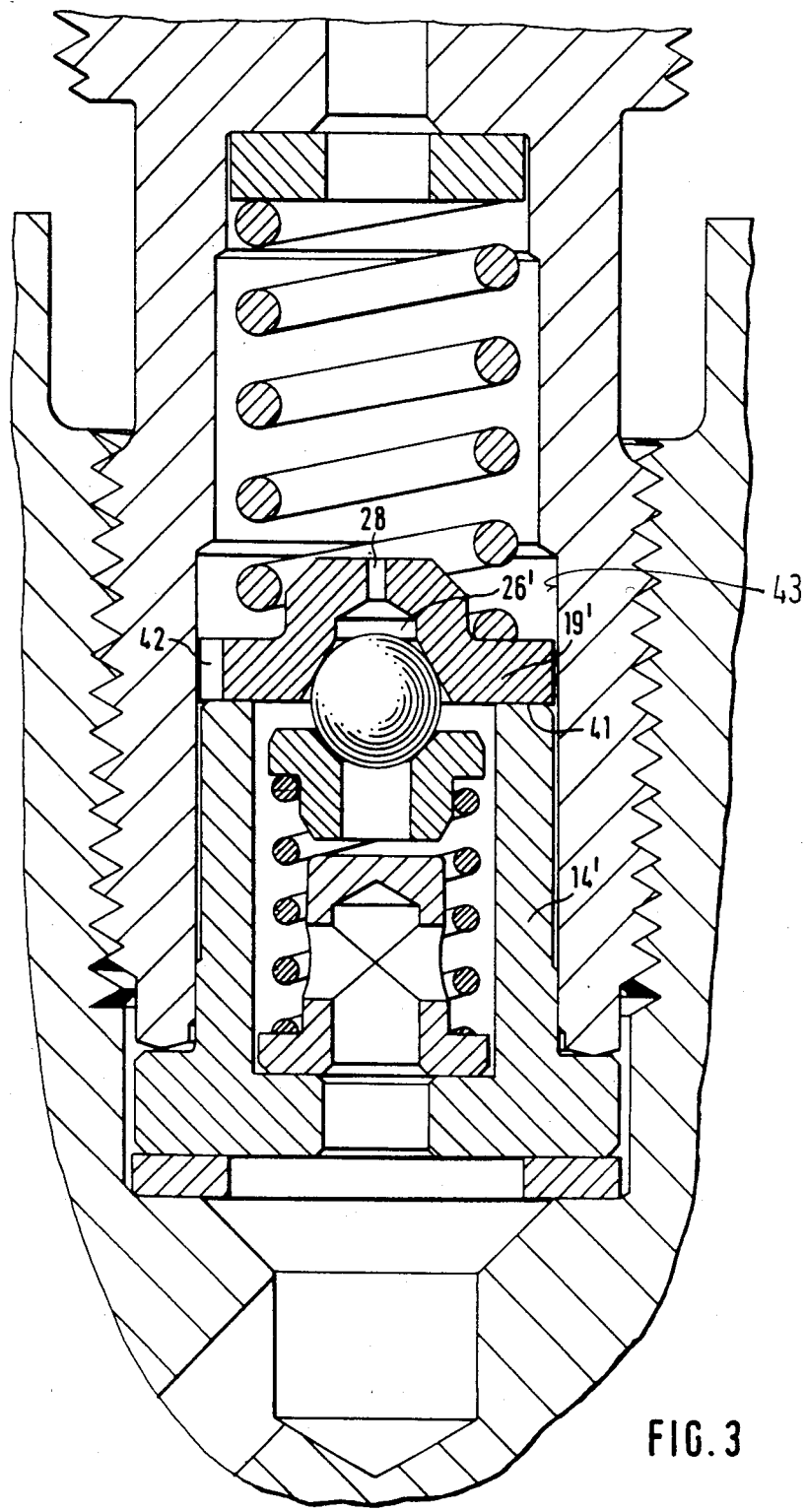
FIG. 3 is a sectional view of yet another modified embodiment of the pressure valve.

Referring now to the drawings, and first to FIG. 1 thereof, which illustrates the first embodiment of the pressure valve according to the invention, the pressure valve 1 is screwed in a housing 2 of the non-illustrated fuel injection pump and is positioned in a fuel supply conduit 4 between the pump working chamber of the non-illustrated fuel injection pump and an injection valve 3 of the non-illustrated internal-combustion engine. The pressure valve has a connection support 6 which is screwed in a threaded bore 7 of the housing 2. The connection support 6 has an axial recess 8 which is open toward the threaded side and has substantially the form of the pocket bore. Coaxially with the axial recess 8 is formed a connecting passage 10 which opens into a connection nipple 11 of the connection support and connects the axial recess 8 with the fuel supply conduit 4.

A tubular valve member 12 is inserted in axial recess 8 at the pump-side end of the valve. Valve member 12 has at its pump-side end a flange 14, by means of which the pump-side end face 15 of the connection support 6 is held on a shoulder 16 of the threaded bore 7. Threaded bore 7 guides the fuel supply conduit 4 from the pump-side end to the pump working chamber.

The tubular valve member 12 has at the front end thereof, extended into axial recess 8, a valve seat 17, with which a ball-shaped sealing surface 18 of a valve locking member 19 comes into contact. The valve locking member 19 has in the known fashion impeller vane-shaped guiding surfaces 20 which lead to an inner bore 21 of the valve member, which inner bore is formed as a through passage. Fuel can pass through between the guiding surfaces 20 toward the valve seat 17. A shoulder 22 of the valve locking member 19 engages in the connection-passage portion of recess 8. A valve compression spring 23, which is supported at another end thereof against a spring washer 24, is positioned at the upper end of recess 8.

The valve locking member 19 has a further longitudinal passage 26 in the form of the elongated bore which extends in the axial direction of the locking member and merges into a throttle orifice 28 provided in a guiding pin 25 which serves for the guidance of the compression spring 23. The end of the elongated bore 26 at the pump-side is formed as a valve seat 29 of a back-pressure relief or check valve 30, the valve closing member 31 of which is a ball. Ball 31 by means of, spring washer 32 and a compression spring 34, clamped between said washer and an inner collar or flange 33 of the valve member 12, is brought to a closed position. A released through passage 35 is provided in inner flange 33 of valve member 12, which passage connects the inner bore 21 with the fuel supply conduit 4.

With reference to FIG. 1a it will be seen that the spring washer 32 advantageously has a central recess 27 adjusted to the ball-shaped of the valve closing member 31. Recess 27 has at its inner edge a funnel-shaped transition portion 39 of a flat course (greater cone angle). Ball 31 thereby is easily brought to its operating position during the assembly. A conical valve seat 29 on the valve locking member 19 is formed in the same manner.

If, during the operation of the fuel injection pump, in which the pressure valve of this invention is inserted, fuel is fed to the internal-combustion engine the valve locking member 19 opens under the pressure of the fuel fed through the conduit 4. The valve locking member 19 returns at the end of the fuel conduit to its valve seat 17. Simultaneously the fuel injection valve 3 is closed at the end of fuel supply conduit 4. Normally in such a connection sudden interruptions of the fuel feeding cause pressure waves in a closed volume between the pressure valve 1 and the fuel injection valve 3, which waves are in such position that the fuel injection valve would repeatedly intermittently open at a later point in time. Due to the provision of the check valve in connection with the throttle orifice 28 the above conditions are prevented. In the case of the occurrence of a pressure wave on the valve locking member 19 the back-pressure relief or check valve 30 opens as soon as a stable pressure, at which the valve must be maintained, is exceeded. Thereby a small amount of fuel flows back through the throttle 28. This causes, via a retarded pressure reduction to the stable pressure adjusted at the check valve 30, damping of pressure fluctuations in the fuel feeding system. At the same time the smallest stable pressure is maintained by means of the check valve so that the occurrence of the exhaust gases in the fuel injection valve and the fuel supply conduit 4, appearing in connection with the pressure build-up in the combustion chamber during the injection process of the fuel injection valve is prevented. Therefore no damage could be done to a precise dosing of the fuel per one working cycle.

The embodiment of the pressure valve shown in FIG. 1 can be easily manufactured with small structural dimensions. The structural components of the pressure valve are easy to assemble and the valve member 12 and the connection support 6 can be held together for the transportation of the pressure valve 1 by a springy clamp or clip 36. The throttle orifice 28 provided in the axial bore 26 can be arranged, for example as a reverse stream throttle in connection with the fuel supply conduit 4 so that this throttle would be disconnected in the known fashion during the fuel feeding to obtain an un-throttled fuel feeding.

In the embodiment depicted in FIG. 2 the constructions of the valve member and of the connection support are substantially similar to those of FIG. 1. Similar reference numerals are utilized in FIG. 2 for denoting of the structural components similar to those of FIG. 1. The embodiment of FIG. 2 differs from the pressure valve of FIG. 1 in that a cap-shaped spring washer 37 is provided, which is clamped between the compression spring 34 and the inner collar or flange 33 of the valve member. The bottom of this spring washer serves as a stop for the spring washer 32 which guides ball 31. Connection openings 38 are formed in the peripheral wall of the cap-shaped spring washer 37, these openings producing ports toward through passage 35. This modified construction has the advantage that greater opening strokes of the back-pressure relief or check valve 30 can be avoided. Due to a labyrinth-like connection formed by connection openings 38 toward the through passage 35 it is prevented that greater particles may appear in the pump working chamber which could cause a break on the structural elements of the pressure valve 1. The opening pressure of the back-pressure relief valve 30 can be easily adjusted by the interpositioning of the spacers on the spring washer 37.

In the embodiment shown in FIG. 3 a valve locking member with a flat valve seat 19' is provided in place of the valve locking member with the ball-shaped valve seat formed in the embodiments of FIGS. 1 and 2. The counter element of the valve locking member is a flat end face 41 of the tubular valve member 12'. The remaining components of this pressure valve are formed similarly to the respective components of the embodiments of FIG. 2. The elongated bore 26 in the construction of FIG. 2 is a shorter recess 26' in the embodiment of FIG. 3. Recess 26' merges into the throttle orifice 28. The advantage of this modification resides in that the structural dimensions in the axial direction can be made very small. The manufacturing of the sealing surfaces is also very simple, and only the exact guidance of the valve locking member 19' is necessary. Therefore guiding surfaces 42 are formed on the edge of the substantially cap-shaped valve locking member 19', which surfaces cooperate with the matched inner bore portion 43 of recess 8.

A particularly advantageous embodiment of the pressure valve of this invention is illustrated in FIG. 4. The connection support 6 screwed in the housing of the fuel injection pump is provided with the axial recess 8, into which a tubular valve member 12' is inserted from the pump-side opening. Valve member 12' has an outer flange or collar 14 which is clamped between the pump-side end face 15 of the connection support 6 and the shoulder 16 formed by the base of the threaded bore 7. The difference between the modified embodiment of FIG. 4 and the structure shown in FIG. 1 is that the valve member 12' has a smooth inner bore 44 in which the valve locking member 19 with the guiding surfaces 20 is guided. A valve seat 17 is also provided in the valve member 12' at the end thereof facing the recess. In the specifically advantageous manner a sleeve 45 is pressed in the valve member 12', which sleeve forms a support for the compression spring 34 of the back-pressure relief valve 30. Sleeve 45 has, preferably at its pump-side end, a roll-in flange 46 against which compression spring 34 can be reliably supported. The roll-in portion 46 limits the axial through passage 35' toward the full supply conduit 4. The advantage of this modified construction resides in that due to a more or less deeper pressing-in of the sleeve 45 the opening pressure of the back-pressure relief valve 30 can be exactly adjusted. This can result, in the assembled condition of the pressure valve, in a very precise adjustment value with very small expenses. The check valve is thereby loaded at the connection-side end with pressure fluid from the constant pressure source at the level of the adjusted holding pressure and sleeve 45 is continually pressed-in unless the valve closes.

In the embodiment according to FIG. 4 the throttle orifice 28 is provided at the opposite end of axial bore 26' and not in the guiding pin 25. Furthermore, in this embodiment a maximal stroke of the valve locking member 19' is limited by the stop on the cap-shaped spring member 37 similarly to the structure shown in FIG. 2.

Figure 5:
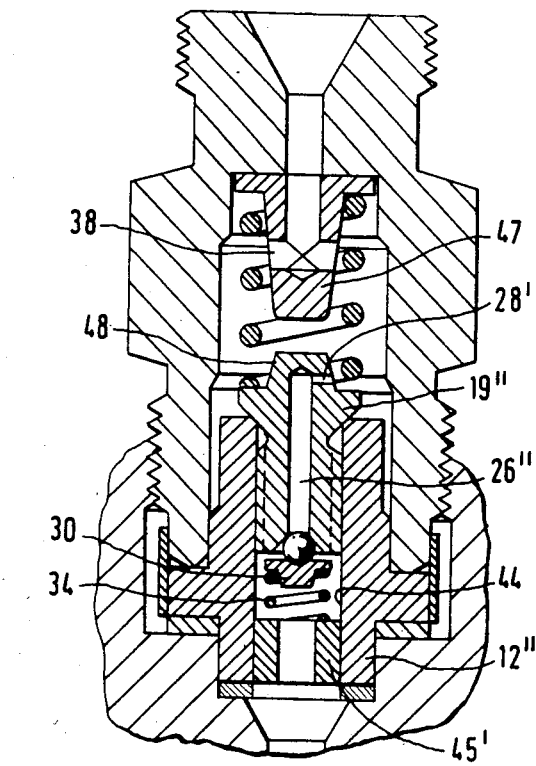
FIG. 5 is a sectional view of yet another modification of the valve.

With reference to FIG. 5, it will be seen that in this modification the valve locking member 19'' is formed so that the throttle orifice 28' branches radially from the pocket bore 26'' and extends in the region of the guiding pin 48 toward the connection-side outer face of the valve locking member 19''. The remaining structure components of the pressure valve of FIG. 5 are similar to the corresponding components of FIG. 4. Valve member 12'' in FIG. 5 has an inner bore 44 in which a sleeve 45' is pressed in. Sleeve 45' acts as a support for compression spring 34 of back-pressure relief valve 30.

The pressure valve shown in FIG. 5 similarly to that of FIG. 4 has the advantage that in the instances when the valve locking member 19' comes to contact with the cap-shaped spring member 47 the throttle orifice 28' is not damaged and is not clogged with contamination particles.

In the embodiment of FIG. 6 the difference between this embodiment and that of FIG. 4 is that the pressure valve of FIG. 6 has a valve locking member with a flat seat 19'''. The valve locking member 19''' has a substantially cap-like shape so that the end face 49 thereof forms the sealing surface. The valve locking member 19''' cooperates with a substantially disc-shaped valve member 14''' which has an axial elongated bore 44' in which sleeve 45 is pressed in similarly to sleeve 45 of the embodiment of FIG. 4. Sleeve 45 also serves as a support for the compression spring 34 of back-pressure relief valve 30 which cooperates at the valve closing member 31 with the axial bore 26 in the valve locking member 19'''. An end side 50 of the valve member 12''', which is adjacent the valve locking member 19''', is surface-ground and acts as a seat for the valve locking member 19'''.

Figure 7:
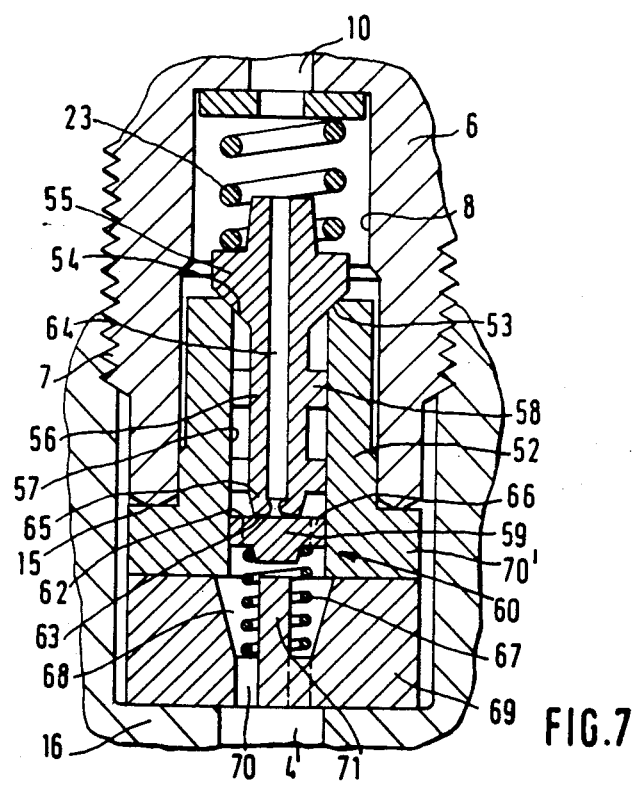
FIG. 7 is a sectional view of yet another modified construction of the valve.

In the embodiment illustrated in FIG. 7 the connection support 6 has also a recess 8 which is in communication with connection bore 10. A tubular portion of the valve member 52 extends in recess 8. The tubular portion of valve member 52 has at its end, facing bore 10, a valve seat 53, with which a corresponding conical sealing surface of the valve bocking member 55 cooperates. Valve locking member 55 is formed substantially similar to the valve locking member 19' of the embodiment of FIG. 4 and has a guiding pin 56 which extends in the through bore 57 of valve member 52 and has guiding surfaces 58 which lie in two parallel radial planes. Guiding surfaces 58 are formed like impeller vanes and form a fuel passage from the pump-side end of the through bore 57 to the valve seat 53. The valve locking member 55 is biased by compression spring 23.

The pump-side end of the through bore 57 is connectable by means of longitudinal bore 64 of valve locking member 55 with the fuel-connection-side portion of recess 8, whereby a throttle or restrictor 65 is provided at the pump-side end 63 of the guiding pin 56 in the bore 64. The pump-side end 63 of the guiding pin 56 is formed as a sealing surface which cooperates with a flat end face 62 of the disc-shaped valve closing member 59. The valve closing member 59 of the back-pressure relief valve 60 has at its radial periphery a guiding vane 66, by means of which the valve closing member 59 is guided in through bore 67. The back side of the valve closing member is loaded with compression spring 67, which is supported in an annular recess 68 of an intermediate plate 69 coupled to the valve member 52. The valve member 52 has, similarly to the previously described embodiments, an outer flange 70, to which the end face 15 of the connection support 6 is applied. Flange 70 holds the valve member 52 together with the intermediate plate 69 on the shoulder 16 formed by the base of threaded bore 7. A number of bores 70 extend from the annular recess 68, bores 70 connecting recess 68 with the fuel supply conduit 4.

This embodiment as well as the embodiments of FIGS. 1, 2 and 3 has the advantage that the adjustment of the opening pressure of the back-pressure relief valve 60 by bringing in of the intermediate plate or disc 69 is easily obtained, and such intermediate ring is advantageous for assembling of the pressure valve, and in addition it ensures accessibility to the assembled components. A further advantage of the pressure valve shown in FIG. 7 is that the valve closing member 59 has a very little mass and can be easily fitted in the plane, in which common sealing surfaces of the pressure valve locking member 55 and of the closing member of the back-pressure relief valve 60 lie. With such little mass it is ensured that, upon reaching of the stable pressure, an exact and quick closing of the back-pressure relief valve 60 follows, without bouncing of this valve back to its initial position. By the provision of a number of through bores 70 in intermediate plate 69 the cross-section of individual bores is maintained very small with the provision of great common cross section for the flow passage, so that a protective action is obtained against the penetration of metallic particles into the pump working chamber if an element of the pressure valve fails.

It will be understood that each of the elements described above, or two or more together, may also find a useful application in other types of pressure valves for fuel injection pumps differing from the types described above.

While the invention has been illustrated and described as embodied in a pressure valve for fuel injection pumps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure valve, which is inserted in a fuel delivery conduit between a pump working chamber of a fuel injection pump and an injection valve of an internal-combustion engine, and comprising a connection element (6) having an axial recess (8) at a pump-side thereof and a connection channel (10) extended from said recess and connectable to the fuel delivery conduit; a valve member (12) provided with a valve seat (17) and having a periphery and formed with a flange (14) at said periphery, said connection element having at the pump side an end face (15), said pump having a housing receiving the pressure valve and being formed with a shoulder (16), said flange being clamped between said end face (15) and said shoulder (16), said valve member having a through passage (21); a locking member (19) cooperating with said valve seat; a compression spring (23) positioned in said axial recess at a side thereof facing said channel, said locking member being inserted between said valve seat and said compression spring and including an axial passage (26); a back-pressure relief valve (30, 60) including a closing member (31) for closing said axial passage (26) and a compression spring (34) which is fixedly supported at least immediately on said valve member, said axial passage being connected with said axial recess; throttle means (28) connecting said axial passage with said axial recess at the side thereof facing said connection channel, said valve member having an axial bore (44) forming said through passage; and a sleeve pressed in said axial bore and forming a support for the compression spring of the back-pressure relief passage.

2. The pressure valve as defined in claim 1, wherein said locking member (19''') is cap-shaped and formed with a flat valve seat, said locking member having one end face (49) forming one sealing surface, said valve member having another end face (50) forming another sealing surface with said one sealing surface.

3. The pressure valve as defined in claim 1, wherein said axial passage (26'') of the locking member is formed as a pocket bore, said throttle means being an orifice formed in said locking member and extended from said pocket bore transversely of an axis of the locking member, said orifice opening at a portion of the locking member (19'') which extends in said axial recess (8).

4. The pressure valve as defined in claim 3, further including a cap-shaped spring washer (47) inserted in said axial recess (8), said spring washer having connection openings (38) extended transversely of a peripheral wall of the spring washer, said spring washer acting as a stop for said locking member.

5. The pressure valve as defined in claim 1, wherein the outer diameter of said flange (14) of the valve member is equal to the outer diameter of the connection element (6) facing said flange; and further including a springy clamp (36) connecting said flange to said connection element.

6. The pressure valve as defined in claim 1, wherein the valve member (52) has a tubular portion inserted in said axial recess (8) and an end face forming the valve seat (53), said locking member (55) having a conical sealing surface (54) cooperating with said valve seat, said locking member having a guiding pin (56) connected to said conical sealing surface, said valve member having an axial through bore (57) into which said guiding pin extends, said guiding pin including guiding surfaces extended in a plurality of radial planes, the closing member (59) of the back-pressure relief valve (60) being substantially disc-shaped and provided with guiding surfaces (66) for a coaxial guidance of said closing member within said through bore (57), said closing member having an end face (62) forming one sealing surface, said locking member (55) having an end face (63) forming another sealing surface cooperating with said one sealing surface.

7. The pressure valve as defined in claim 1, wherein said locking member has a guiding pin facing the compression spring (23), said throttle means being a throttle orifice formed in said guiding pin.

8. A pressure valve, which is inserted in a fuel delivery conduit between a pump working chamber of a fuel injection pump and an injection valve of an internal-combustion engine, and comprising a connection element (6) having an axial recess (8) at a pump-side thereof and a connection channel (10) extended from said recess and connectable to the fuel delivery conduit; a valve member (12) provided with a valve seat (17) and having a periphery and formed with a flange (14) at said periphery, said connection element having at the pump side an end face (15), said pump having a housing receiving the pressure valve and being formed with a shoulder (16), said flange being clamped between said end face (15) and said shoulder (16), said valve member having a through passage (21); a locking member (19) cooperating with said valve seat; a compression spring (23) positioned in said axial recess at a side thereof facing said channel, said locking member being inserted between said valve seat and said compression spring and including an axial passage (26); a back-pressure relief valve (30, 60) including a closing member (31) for closing said axial passage (26) and a compression spring (34) which is fixedly supported at least immediately on said valve member, said axial passage being connected with said axial recess; throttle means (28) connecting said axial passage with said axial recess at the side thereof facing said connection channel, said valve member having a tubular portion inserted in said axial recess, said tubular portion having an end face forming said valve seat; and a cap-shaped spring washer (37) inserted between the compression spring of the back-pressure relief valve and said valve member.

9. The pressure valve as defined in claim 8, wherein said locking member is cup-shaped and formed with a flat valve seat, said locking member having one end face forming one sealing surface, said valve member having another end face forming another sealing surface with said one sealing surface.

10. The pressure valve as defined in claim 8, wherein said axial passage of the locking member is formed as a pocket bore, said throttle means being an orifice formed in said locking member and extended from said pocket bore transversely of an axis of the locking member, said orifice opening at a portion of the locking member which extends in said axial recess.

11. The pressure valve as defined in claim 10; further including an additional cap-shaped spring washer (47) inserted in said axial recess, said spring washer (47) having connection openings extended transversely of a peripheral wall of the spring washer, said spring washer acting as a stop for said locking member.

12. The pressure valve as defined in claim 8, wherein the outer diameter of said flange of the valve member is equal to the outer diameter of the connection element facing said flange; and further including a springy clamp (36) connecting said flange to said connection element.

13. The pressure valve as defined in claim 8, wherein the valve member has a tubular portion inserted in said axial recess and an end face forming the valve seat, said locking member having a conical sealing surface cooperating with said valve seat, said locking member having a guiding pin connected to said conical sealing surface, said valve member having an axial through bore into which said guiding pin extends, said guiding pin including guiding surfaces extended in a plurality of radial planes, the closing member of the back-pressure relief valve being substantially disc-shaped and provided with guiding surfaces for a coaxial guidance of said closing member within said through bore, said closing member having an end face forming one sealing surface, said locking member having an end face forming another sealing surface cooperating with said one sealing surface.

14. The pressure valve as defined in claim 8, wherein said locking member has a guiding pin facing the compression spring, said throttle means being a throttle orifice formed in said guiding pin.

15. The pressure valve as defined in claim 1, wherein said valve member is substantially disc-shaped.

* * * * *